March 3, 1959 P. F. DANEL ET AL 2,875,979
HYDROELECTRIC TURBO-GENERATOR INSTALLATION
Filed Sept. 4, 1953 4 Sheets-Sheet 1

INVENTORS
PIERRE F. DANEL
SEVERIN X. CASACCI
BY PAUL JARRIAN

ATTORNEY

March 3, 1959 P. F. DANEL ET AL 2,875,979
HYDROELECTRIC TURBO-GENERATOR INSTALLATION
Filed Sept. 4, 1953 4 Sheets-Sheet 2
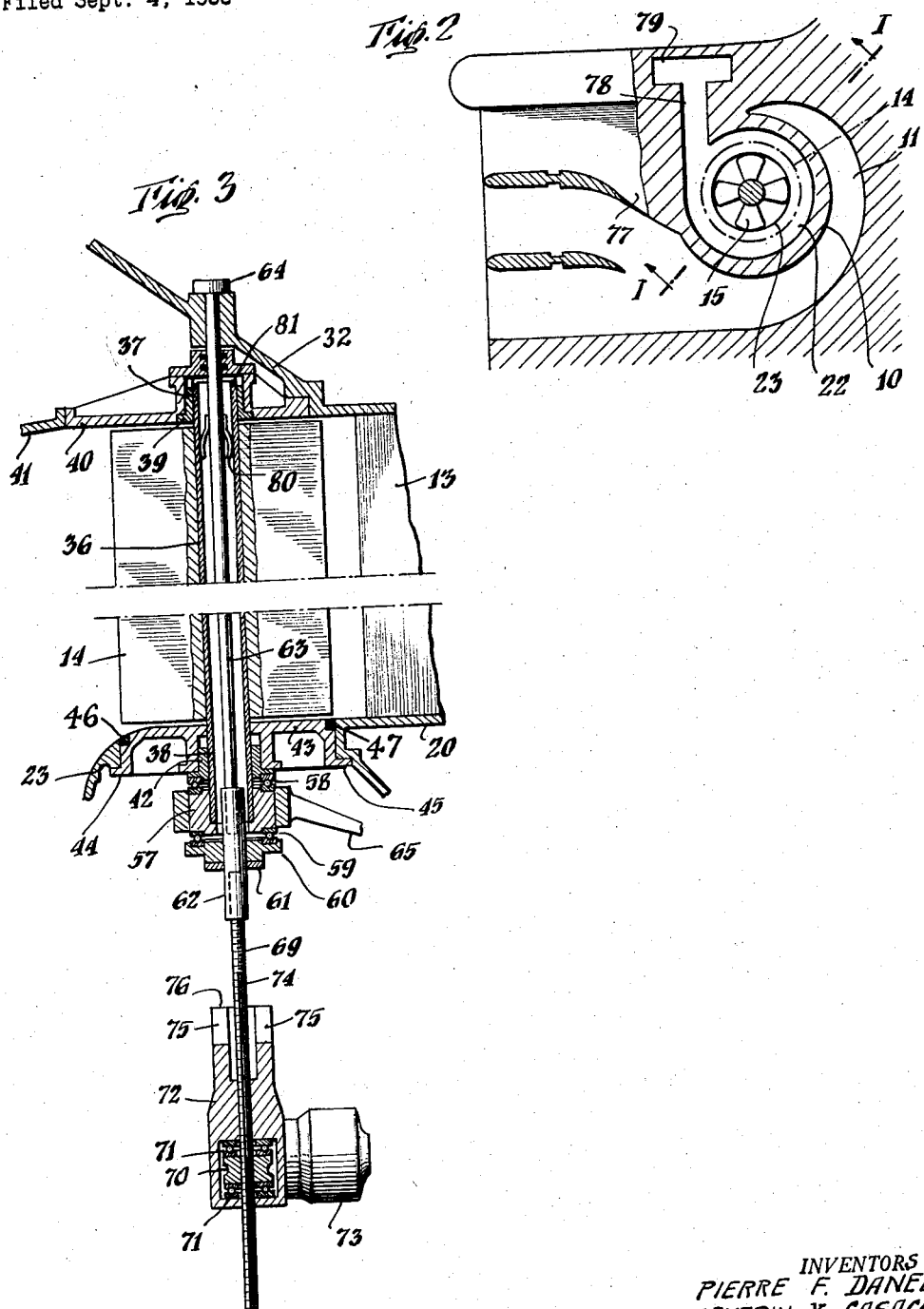
INVENTORS
PIERRE F. DANEL
SEVERIN X. CASACCI
PAUL JARRIAN
BY
George W. Corey
ATTORNEY

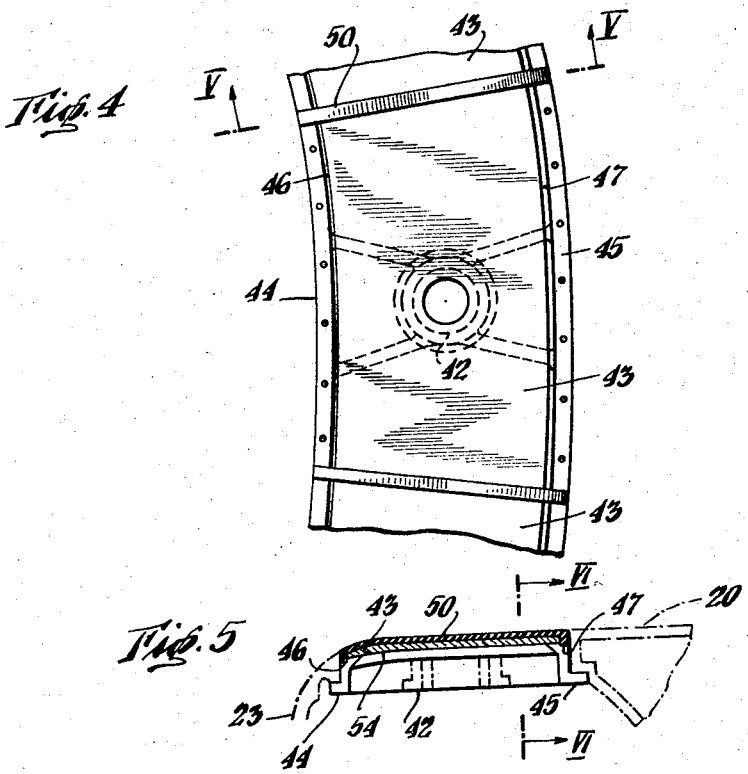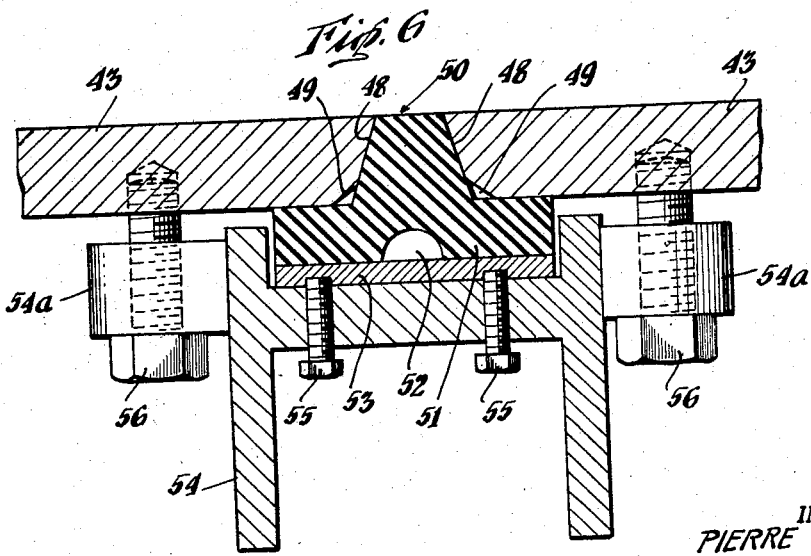

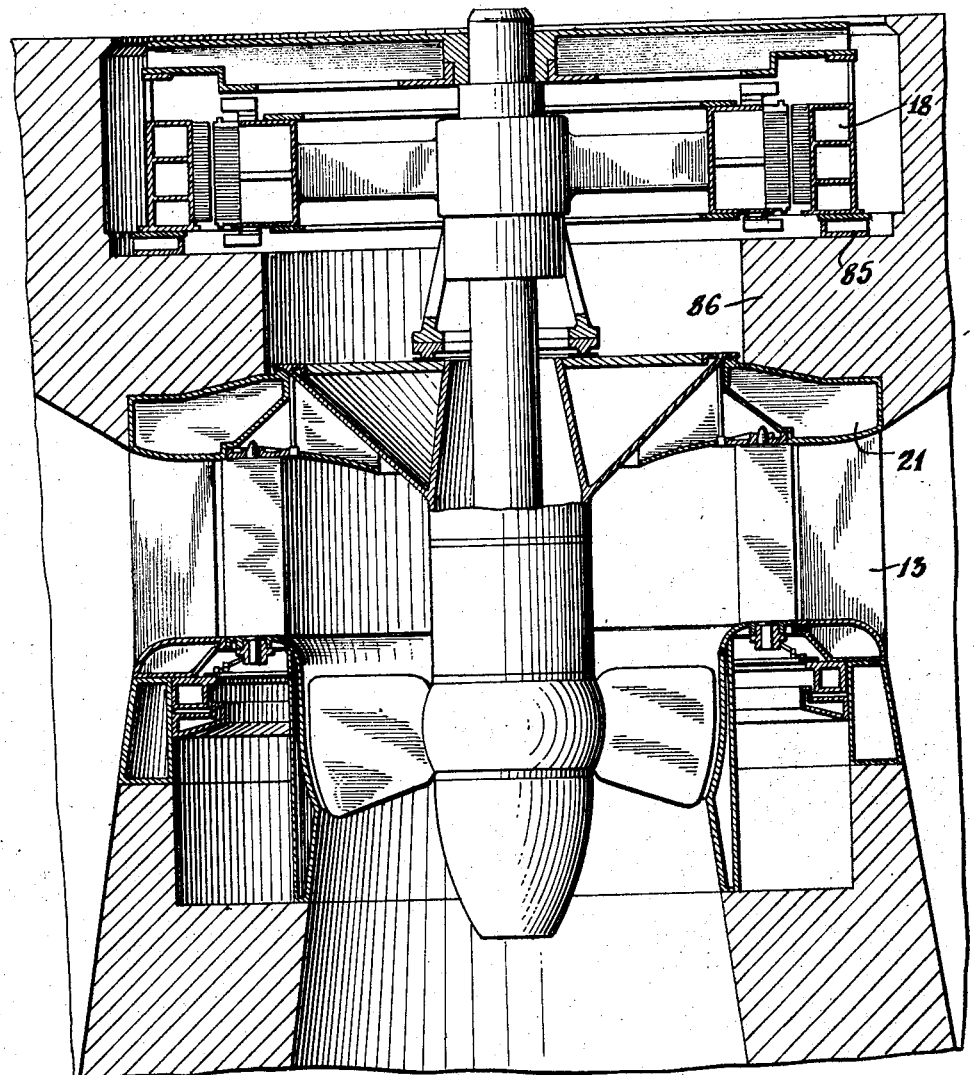

United States Patent Office 2,875,979
Patented Mar. 3, 1959

2,875,979

HYDROELECTRIC TURBO-GENERATOR INSTALLATION

Pierre F. Danel and Severin X. Casacci, Grenoble, and Paul Jarrian, Allevard-les-Bains, France, assignors to Etablissements Neyrpic, Grenoble, France, a corporation of France Application September 4, 1953, Serial No. 383,814

Claims priority, application France September 4, 1952
(Filed under Rule 47(a) and 35 U. S. C. 116)

9 Claims. (Cl. 253—31)

This invention relates to hydraulic turbine installations and more especially to hydroelectric turbo-generators. The invention more particularly relates to hydraulic turbine installations employing fixed guide vanes and adjustable wickets for control of the water flow and to the structures for support of and operation of these control means.

In certain conventional hydraulic turbine installations a turbine of the Kaplan type is employed in which fixed guide vanes or stay vanes are carried in the so called speed ring or stay ring disposed within the annular structure forming the so called scroll or spiral casing, adjustable guide vanes or "wickets" also being supported in a distributor ring disposed adjacent and within the stay ring, these wickets cooperating with the stay vanes in controlling the amount of water flowing from the scroll casing to the turbine runner and then through the draft tube toward the tail race. In such conventional installations an electric generator, usually an alternator, ordinarily is disposed above the turbine runner and above the structure supporting the guide vanes and wickets. This generator may be supported by the masonry of the dam structure which provides also between the turbine and the generator a pit or well within the masonry structure. This well forms an interior space available for the assembly and disassembly of the various elements of the installation, such as the thrust bearing, when this space is disposed between the turbine and the generator. In addition this space may provide for receiving various elements for controlling and regulating the unit, such as the annular operable member of the vane control means which determines the different positions of the wickets.

These conventional arrangements have certain disadvantages. Such constructions require that the pit or well shall have a large diameter which makes it necessary, in order to transmit to the masonry the forces brought upon the thrust bearing, that the forces carried by the upper turbine cover upon which the thrust bearing is supported be transmitted to the upper cover of the distributor ring supporting the guide vanes or wickets and then to the stay ring carrying the stay vanes, this stay ring transmitting this thrust to the masonry foundation. The two covers, therefore, must be very strong and particularly that of the distributor must be of larger dimensions than would be necessary if it served merely as a bearing for the wickets. The control elements of the distributor being disposed above the wickets, the upper pivots of the wickets must enter bearings at the considerable height of the corresponding cover the stresses imposed on which are transmitted to these bearings. The resulting strains are sufficient to increase greatly the force necessary for actuating the distributor and may cause jamming of the wickets.

The upper cover of the distributor ring might be made with such dimensions as to insure its function of supporting the wickets and also transmitting to the masonry the weight of the rotor by utilizing an intermediate member placed above this distributor ring. As this intermediate piece would be required to be pierced by a large number of holes to provide for passage of the pivots of the wickets, the design of this piece would become difficult. The elevated position of the electric generator, moreover, requires a considerable height of the installation which makes it necessary to provide an overhead crane and supports likewise at considerable height and, therefore, involving considerable cost.

It is an object of the invention to provide an improved hydraulic turbine installation in which the above indicated disadvantages are avoided and in which various advantages are secured.

It is another object of the invention to provide an improved structure supporting the turbine unit and an improved disposition of the members of the unit in this structure.

It is another object of the invention to provide a hydraulic turbine installation in which the distributor ring for the wickets is not employed to transmit stress from the thrust bearing or the weight of the unit to the masonry.

It is a further object of the invention to provide improved means for operating the wickets of the distributor and improved means for supporting these wickets in the distributor.

It is a still further object of the invention to provide a hydraulic turbine installation in which the wickets of a hydraulic turbine installation in which the wickets of the distributor may be easily removed.

It is an additional object of the invention to provide a hydroelectric turbo-generator installation in which improved means for cooling the electric generator are provided.

It is a feature of the invention that the upper cover of the turbine which supports the rotating assembly of the unit bears directly on the upper cover of the stay ring which carries the stay vanes, these covers being disposed above the ring of the distributor which supports the guide vanes or wickets and without engagement with the upper pivots of these wickets. In accordance with this feature of the invention the stay ring and the upper and lower covers thereof provide a rigid structure capable of transmitting directly to the masonry the weight and forces transmitted to this stay ring from the thrust bearing and the rotating members of the turbine.

It is a further feature of the invention that the mass of the masonry upon which the stay ring is supported and which separates the space of the scroll case from the entrance to the draft tube in which the runner is disposed is formed to provide an annular gallery extending about the axis of the runner within this mass and disposed directly beneath the ring of the distributor supporting the wickets. In this gallery are disposed the control members for operating the wickets, including the conventional annular member which is connected to the several wickets and is rotatable on the axis of the runner for effecting movement of these wickets between the open and closed positions thereof. The control members, therefore, are disposed below the distributor ring and not above the distributor, as in conventional installations. The ring of the wickets, therefore, forms a unitary assembly separate from the stay ring carrying the stay vanes. In accordance with this feature of the invention the upper cover of the distributor has no connection to the cover of the turbine or to the upper cover of the stay ring such that this distributor cover is subjected to any of the stress brought upon the turbine cover and the stay ring cover. With such a construction any strain due to variations of the load on the unit or resulting from conditions while running as compared with those when the unit is stopped does not involve the risk of disturbing the operation of the wickets. In particular, jamming is avoided. Moreover, the otherwise frequently considerable reinforcement of the metal of the bearings for the upper pivots of the wickets which would be necessary when these bearings are subjected to forces due to load on the unit is avoided.

The annular gallery above referred to may be made sufficiently large to permit the mounting and demounting of the wickets, the inner wall of this gallery being formed by the throat ring of the draft tube, and a part at least of this throat ring may be demountable in order to provide access from the gallery to the blades of the runner, thereby to provide to a great extent for mounting and demounting these blades.

It is another feature of the invention that the construction above described makes it possible, on the one hand, to dispose the electric generator at a lower elevation and with its stator resting directly on the stay ring, or, on the other hand, to reduce considerably the interior diameter of the well. The total height of the unit may be considerably reduced while the electric generator may be disposed immediately adjacent the passage for the relatively cold water supplied to the turbine. The generator, therefore, operates under favorable conditions. Moreover, the masonry may be reinforced by certain of the parts, such as the upper cover of the stay ring, which may be solidly embedded and sealed in the concrete. This provides a support suitable for taking the strain due to the weight and to the operation of the unit. It is possible by judicious compromise to reduce both the total height of the unit as well as the diameter of the well.

Other objects and features of the invention will be understood from the following embodiments taken, by way of example, in connection with the drawings in which:

Fig. 2 is a plan view, partly in section, taken along line II—II of Fig. 1, showing also the masonry construction supporting the installation;

Fig. 3 is a detailed, vertical view, partly in section, of a wicket installation in accordance with this invention;

Fig. 4 is a fragmentary plan view of the lower cover of the wickets (lower distributor ring);

Fig. 5 is a sectional view taken along line V—V of Fig. 4;

Fig. 6 is a sectional view taken along line VI—VI of Fig. 5; and

Fig. 7 is a vertical view, partly in section, of a turbogenerator installation similar to that shown in Fig. 1, but wherein the diameter of the well is reduced and wherein the generator stator is supported by the masonry structure of the installation.

Figure 1:
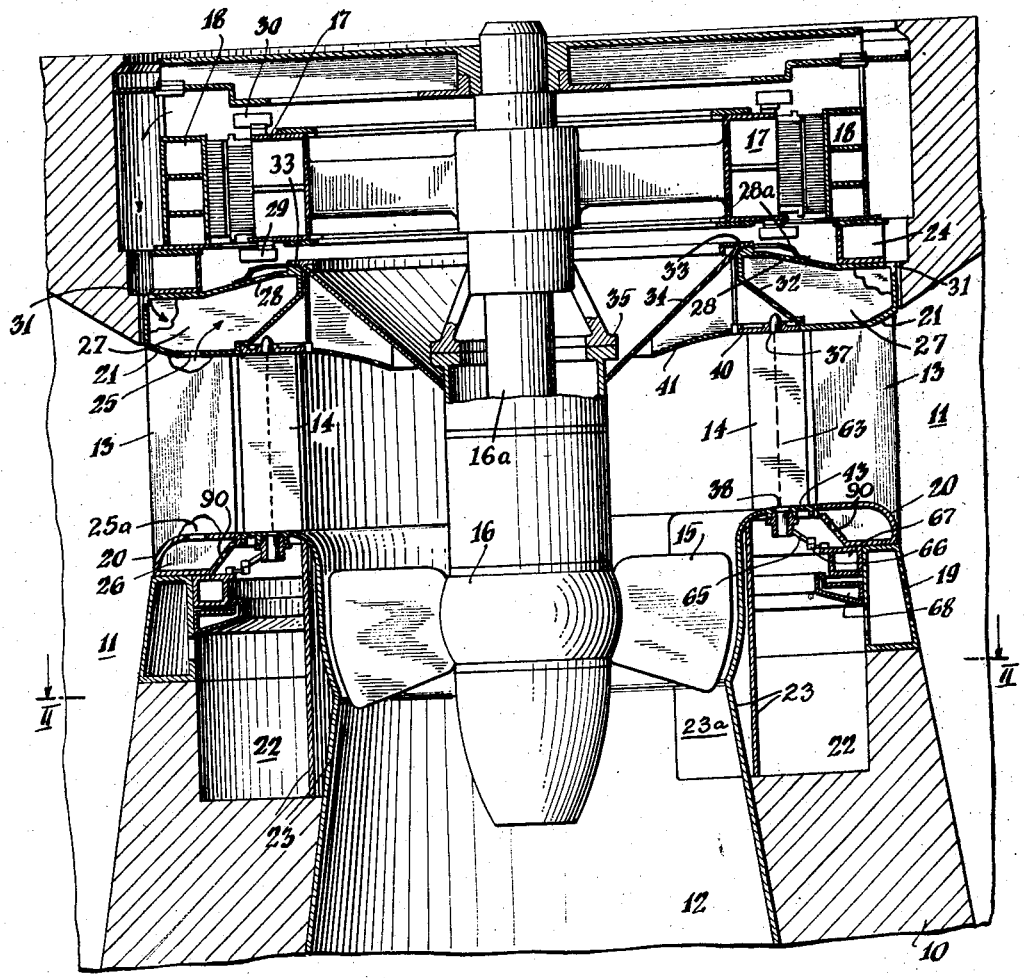
Fig. 1 is a vertical view, partly in section, of a hydroelectric turbo-generator installation embodying a Kaplan-type turbine, taken along the line of I—I of Fig. 2.

Referring to Figs. 1 and 2, there is shown a vertically disposed hydroelectric turbo-generator unit employing a Kaplan-type turbine. The supporting foundation 10 extending about the draft tube 12 is encompassed by scroll case 11 which supplies the water to the turbine. The water upon leaving scroll case 11 to enter the turbine is guided by stay vanes 13 disposed circumferentially about the runner axis and supported on the foundation 10. After passing between stay vanes 13, the water is then guided by the circumferentially arranged guide vanes or wickets 14 toward and so as to impinge upon blades 15 of the turbine runner 16. After passing the runner blades the water passes into draft tube 12 from which it is discharged downstream. Runner 16 is coupled by shaft 16a to the rotor 17 of the generator, the stator of which is indicated at 18.

The foundation 10 carries and supports the weight of the installation. Supported by foundation 10 is a hollow annular ring 19 which is located adjacent the outer periphery of and immediately below the ring of stay vanes 13. The ring of stay vanes 13 is supported on ring 19 and is provided with lower hollow cover 20 and upper hollow cover 21. Gallery 22 is located within foundation 10 and directly beneath wickets 14. The inside wall of gallery 22 is provided by a double walled enclosure 23 forming the throat ring which surrounds blades 15, the wall 23 having a removable portion 23a of arcuate extent about the axis and a height corresponding to the height of the gallery 22. The portion 23a is removable into the gallery 22 to provide an opening for access directly to the turbine runner and to the turbine blades which may be removed through this opening into the gallery 22.

Upper cover 21 of the stay vane ring carries annular block 24 which directly supports stator 18 of the generator. The generator thus is disposed closely adjacent the water passage and, therefore, close to constantly cooled walls.

The proximity of the generator to the stay vanes 13, as indicated in Fig. 1, is of advantage in providing a simple and convenient arrangement for cooling the generator by means of air circulation. Accordingly, air cooling of the generator, making use of the water which is supplied to the turbine, is accomplished in the following manner. Each stay vane 13 is hollow and communicates at its respective ends with lower hollow cover 20 and upper hollow cover 21 by means of openings 25a and 25, respectively. Lower hollow cover 20 is provided with partitions 26 which are located between the vanes of each set of two adjacent stay vanes 13, that is, between alternate water passages between vanes 13, whereas upper hollow cover 21 is provided with partitions 27 located between each stay vane and the adjacent stay vane, that is, above each passage between vanes 13. Openings 28 from alternate compartments are located in the top of cover 21 in proximity to ventilator or scoop 29 carried by rotor 17 of the generator. Baffles 28a are used in conjunction with openings 28 in order better to direct the flow of air therefrom to scoops 29. Scoops 29 circulate the air within the generator. Scoops 30 carried by the rotor at its upper side act to move the air down around the outside of stator 18. The air then passes through openings 31 located in the top of cover 21 into the compartments within cover 21 alternating with those having openings 28. Thence it flows downwardly in one hollow stay vane to a compartment of cover 20 and then upwardly in an adjacent stay vane so that the air is cooled by the water flowing past these vanes.

As illustrated in Fig. 1, the flow path of the circulating cooling air is indicated by the arrows. The air flowing down within alternate stay vanes 13 flows through the compartments between partitions 26 of the cover 20 and then flows upwardly in the intermediate vanes, passing through alternate compartments within cover 21, then across and around the generator to cool the same as described. The air heated in the generator then flows into alternate compartments between partition 27 within cover 21 and into the corresponding stay vane in communication therewith from which it recirculates into the communicating compartment within cover 20. The generator thus is effectively cooled and may be subjected to temporary overloads without undue heating. Additionally, by circulating relatively warm air through stay vanes 13, warming of the stay vanes is accomplished with the result that during winter time deposition of ice thereon is inhibited.

As indicated hereinabove and illustrated in Fig. 1, the distributor ring comprising the upper and lower covers 40 and 43 and the wickets forms an assembly which is separate from that of the stay vane covers and the stay vanes and is supported by the stay ring without such rigid connection thereto that deformation of the stay vane covers, upper and lower covers 21 and 20, respectively, would be transmitted to the wicket covers and to the wickets.

The turbo-generator assembly of Fig. 1 is supported by the stay vanes in the following manner. Upper cover 21 of the stay vane ring extends inwardly over and above the wickets in an annular prolongation or extension 32 of cover 21 which supports flange 33 of the inverted conical turbine casing 34 which may be constructed in one or several parts. Turbine casing 34 in turn supports the thrust bearing 35. Bearing 35 supports the entire rotating assembly of the unit comprising rotor 17 and runner 16. It is thus seen that the weight of the installation is transmitted to foundation 10 by means of casing 34, top cover 21, stay ring and vanes 13, bottom cover 20 and hollow annular ring 19, that is to say, by an assembly structure which extends above the wickets and their pivots in spaced relation thereto. As a result, the wickets and wicket covers are free from mechanical deformation or strain to which the supporting members are subject brought on by being subjected to stress due to variation of the forces acting on the thrust bearing as between a condition of running and one of rest, since the wickets and their covers are not required to carry or transmit any load. As a result, the wickets are not subject to jamming and are easily operated.

Referring now to Fig. 3, each wicket 14 is rigidly supported on a hollow, vertical central pivot shaft 36 extending therethrough which has an upwardly projecting end 37 extending above the top of the wicket and a downwardly extending end 38 extending beyond the bottom of the wicket. Ends 37 and 38 act as pivots for the wicket. Upwardly extending end 37 is rotatably mounted in the bearing 39 which is fitted in annular top guide wall 40 of the water passage. Cover 40 is supported without rigid connection to the cover 21 of the stay vanes so that practically no strain is brought upon the bearing 39. A second guide wall 41, Figs. 1 and 3, extends between the walls 40 and 34 for the water passage.

Downwardly extending end 38 of each wicket is rotatably mounted in lower bearing 42 which in turn is mounted in a separate bottom plate 43 for each wicket. The bottom cover of the wickets is made up of a number of plates 43, see Fig. 4, and forming an annular structure providing a path continuous with the water flow passage and providing also the top or ceiling for gallery 22. Each plate 43 is of such size and shape that the wicket connected thereto at least in one position, for example, when turned in a diagonal direction with respect to the plate, does not project beyond the edges of plate 43. As illustrated in Figs. 3 through 6, inclusive, plate 43 is fastened by means of bolts or other suitable connections at flange 44 to wall 23, of the throat and at flange 45 to lower cover 20 of the stay ring. The annular joints 46 and 47 are made water tight by packing between the plate 43 and the throat wall 23 and between the plate 43 and the cover 20. As illustrated in Fig. 5, flanges 44 and 45 are designed in such a manner that each plate can be removed from within gallery 22.

The radial connections between plates 43 are made water tight in the following manner. The adjacent edges 48 of two plates 43 are beveled toward the top and toward the middle of the joint as indicated in Fig. 6. Moreover, the lower portion 49 of each edge 48 also is chamfered to break the corner. A radial water tight joint is obtained by locating between each plate 43 suitable compressible material 50. This material or insert has a cross section generally in the form of an inverted T the upper stem portion of which has a trapezoidal shape reducing in width in the upward direction away from the horizontal portion. The sides of the upper stem portion have a slope or inclination matching that of beveled edges 48. The widened lower horizontal portion 51 of material 50 has at its lower face a groove 52 centrally located within the horizontal portion and beneath the stem portion, this groove extending along the length of the material. Material 50 is supported at its lower portion by supporting strip 53 disposed in the bottom of the upper trough of an H beam 54. Screws 55 are threaded in the horizontal web of this H beam 54 and engage strip 53. A plurality of screws 55 are located along the length of H beam 54 and can be screwed into or out of the latter at desired locations along strip 53. H beam 54 also carries at its sides and along its length lugs 54a through holes in which screws 56 are extended each threadedly engaged in a plate 43. The tightening of each radial joint between plates 43 acts also on the annular joints 46 and 47 and a completely tight seal is secured not only between plates 43 and casing 23 and cover 20 but also between the several plates.

Chamfered covers 49 and groove 52 insure that when the material 50 is compressed by screwing up on screws 56 bulging of material 50 beyond the surface of plates 43 is avoided. Normally, a thoroughly watertight joint can be achieved by means of screws 56. However, screws 55 are provided for locally improving the water tight seal along the length of material 50.

As shown in Fig. 3, below bearing 42 fitted into the bottom of plate 43 and rotatably receiving the lower end 38 of pivot shaft 36, a collar 57 is fixedly connected to the lowermost end 38 of the shaft 36. The top of collar 57 bears against the flange of bearing 42 through a ball thrust bearing 58. The bottom surface of collar 57 bears against a disc 60 through a ball thrust bearing 59. Disc 60 is supported on a sleeve 62 by means of pin 61 against downward movement but is upwardly slidable on the sleeve 62 away from pin 61, the pin 61 extending transversely through and projecting outwardly from the sleeve 62. The upper end of sleeve 62 is tapped to engage the threaded lower end of rod 63 which is centrally located and with clearance within pivot shaft 36. Rod 63 is supported at its upper end by means of head 64 which bears on a hub formed in sloping bottom portion 32 of cover 21 in such a manner that the entire weight of wicket 14 normally is supported by plate 60 and transmitted by means of pin 61, sleeve 62 and rod 63 to cover 21. The position of wicket 14 between plates 40 and 43 may be adjusted by adjusting the setting of the sleeve 62 threaded on rod 63.

Crank arm 65 of the wicket operating mechanism is fixedly connected to collar 57 so that upon movement of arm 65, wicket 14 also is moved. Arm 65 is articulated to connecting rod 66 of the operating mechanism and connecting rod 66 in turn is articulated to the annular member of the wicket operating mechanism which is supported for rotary motion about the axis of the runner and is operable so as to vary the settings of all wickets 14 together. The wickets, for example, may be in the fully open position when they are radially disposed and in the closed position when the wickets are pivoted to positions with adjacent sides of adjacent wickets in contact with each other. The annular member 67 of the wicket operating mechanism located as shown in Fig. 1, together with arms 65 and connecting rods 66 are located within gallery 22 below the wickets 14. The annular member 67 of the wicket operating mechanism and its control elements may be of any appropriate type, for example, as described in the French application on the invention of Pierre F. Danel, filed July 1, 1952, Patent No. 1,102,928, published October 27, 1955. In this application and patent connecting rods, corresponding to connecting rods 66, Fig. 1 of the present disclosure, are connected to a hollow torus shaped body co-axial with and rotatable on the axis of the turbine. Within the annular space of this hollow torus one or more torus shaped pistons are disposed which are secured by suitable means in fixed relation to the frame of the turbine. Pressure of the fluid within the hollow spaces of the torus acting on the fixed piston and the walls of the hollow torus effects rotational movement of the torus and corresponding movement of the wickets. The hollow annular member 67, Fig. 1, for example, similarly may be provided with inner torus shaped pistons fixedly connecting to the annular supporting ring 19 in order to secure corresponding operation of the wickets 14. An arrangement of this type when applied to the present invention would noticeably increase the amount of available space within gallery 22. As shown in Fig. 1, annular member 67 so arranged is supported by annular bracket 68 located at the inner periphery of hollow cover 19 in such a manner as to completely free the circular space within gallery 22 located directly beneath plates 43 and wickets 14.

In accordance with this invention, gallery 22 is available for lowering into this space the member of the assembly of wickets 14 and plates 43 which it is desired to remove from the unit, for example, for repair. To this end the annular member 67 is moved by the control to dispose all wickets 14 diagonally with respect to plates 43 so that none of the wickets projects beyond the edges of the respective supporting plates 43. Shaft 69, Fig. 3, is then screwed into the lower threaded end of sleeve 62, the bottom end of shaft 69 being steadied at the floor of gallery 22 by suitable means. Nut 70 within body 72 is threaded on shaft 69 and is rotatably mounted within body 72 by means of ball bearings 71. Nut 70 is rotated by means of a worm engaging a worm gear cut upon the circumference of the nut, the worm being rotated by motor 73 which is mounted on body 72, rotation of the motor in one direction or the other causing body 72 to move up or down along shaft 69. In order to avoid rotation of body 72 around shaft 69, shaft 69 is provided with a longitudinal groove 74 forming a keyway within and along which a key (not shown) carried by body 72 is adapted to move. Body 72 is slotted at 75 at its upper end so that the end 76 of the parts at either side of the slot may straddle the pin 61 and bear directly against plate 60 without touching pin 61 when the body 72 is moved upwardly into engagement with plate 60.

In order to remove wicket 14, body 72 is thus moved up along rod 69 until pin 61 is located within notches 75. When the upper end 76 of body 72 comes into contact with plate 60 and the weight of the structure supported by collar 57 is carried by the body 72 and shaft 69 pin 61 is removed. The weight of wicket 14 is now carried by body 72 and rod 69. Crank arm 65 and connecting rod 66 then are disconnected and removed. Flanges 44 and 45 of the plates 43 then are disconnected and the radial H beams also are disconnected from the adjoining plates 43 by loosening screws 56 and may be demounted.

By controlling motor 73, body 72 together with plate 43 and wicket 14 both now supported by this body, as well as crank 65, may be moved downwardly along rod 69. This entire assembly can then be set upon a truck placed within gallery 22 and then taken to an appropriate access passageway for removal outside, this passageway being disposed, for example, at the exterior side of the scroll case 11. In the case where foundation 10 is encompassed by a semi-spiral scroll case of the type described in the French application filed August 28, 1952, Improvements in Semi-Spiral Scroll Cases, now French Patent No. 1,063,328, published May 3, 1954, and in the corresponding copending United States application Serial No. 360,691 filed June 10, 1953, now Patent No. 2,773,666, wherein a masonry structure 77, Fig. 2, forms a ramp sloping upward lengthwise thereof and reaching a substantial size at the lower cover 20, the access passageway 78 to gallery 22 is located within block 77 at the same level as gallery 22. A vertical access shaft 79 may be provided between two adjacent units for communication with access passageways 78 so that the equipment carried from the gallery to the passage 78 may be raised within the shaft 79 and removed by an overhead crane, for example.

The assembly of the wickets is carried out in much the same fashion as the disassembly. For assembly, flexible plates or clips 80, Fig. 3, are carried by and disposed about the upper portion of rod 63 so that upper end 37 may be guided and recentered within upper bearing 39. The upper end of end 37 of the hollow shaft 36 is beveled at 81 in order to facilitate the insertion of this shaft in bearing 39.

Besides its availability in the disassembly and assembly of the wickets, gallery 22 permits ready access to the various other parts of the turbo-generator, especially blades 15. To remove blades 15, it is only necessary to remove the portion 23a of enclosure 23 in order to gain access to conduit 12 from gallery 22. Furthermore, when all the space within gallery 22 is not required for mounting and demounting of the wicket and runner structures, there may be located the servo-motor (not shown) for operating the wicket mechanism, the devices (not shown) for regulating the operation of the unit and other accessory and control equipment useful in the operation of the turbo-generator. Due to the close proximity of lower cover 20 carrying warm air to gallery 22, heating and air conditioning of gallery 22 can be accomplished by providing an opening or openings 90 in cover 20 communicating with the gallery 22, through which openings the air may flow from the cover 20 into the gallery 22.

Referring now to Fig. 7, there is illustrated an embodiment of this invention wherein all the elements of the turbine are located exactly as shown in Fig. 1 but wherein the generator has been moved up with respect to the turbine. Stator 18 is supported by means of annular block 85 on masonry ring 86. Top cover 21 for stay vanes 13 is solidly set and sealed in the lower portion of ring 86.

The cooling of the generator of Fig. 7 may be carried out by conventional means.

This invention is not limited to the arrangements and to the embodiments shown and described hereinabove. Modifications and changes are possible in different constructions without departing from the spirit or scope of this invention. For example, the invention is not restricted to the vertically disposed turbo-generator installations employing a Kaplan type turbine which have been described but in its different aspects is applicable to other hydraulic turbine installations.

We claim:

1. A hydraulic turbine installation comprising a turbine runner disposed for rotation thereof on an axis extending generally vertically, a stay vane ring extending about the axis of said runner and having stay vanes extending generally vertically and disposed in spaced relation about said axis outwardly with respect to said runner for distributing the flow of water to said runner, a plurality of wickets disposed in spaced relation about said axis of said runner adjacent and inwardly towards said axis with respect to said stay vane ring, said wickets being disposed with the planes thereof generally vertical, means disposed respectively adjacent the upper and lower ends of said wickets for supporting said wickets for movement thereof to different angularly related positions of said vertical planes thereof for regulating the flow of water distributed to said runner through said stay vane ring, at least said upper wicket supporting means being supported on said stay vane ring, a thrust bearing for said runner, and means providing a rigid connection between said thrust bearing and said stay vane ring for transmitting to said stay vane ring and to said stay vanes forces due to the weight and thrust of said runner, said rigid connection means being connected to said stay vane ring independently of said wicket supporting means at a portion of said stay vane ring disposed above said upper wicket supporting means so as to transmit said forces to said stay vane ring without transmitting said forces through said wicket supporting means.

2. A hydraulic turbine installation as defined in claim 1 in which said wicket supporting means comprises pivot means disposed respectively adjacent the upper and lower ends of said wickets and supported by said stay vane ring for supporting said wickets for pivotal movement thereof on an axis extending generally vertically.

3. A hydraulic turbine installation as defined in claim 1 which comprises a supporting foundation having a portion extending about the axis of said runner and disposed outwardly with respect to said runner, said stay vane ring being supported on said portion of said foundation.

4. A hydraulic turbine installation as defined in claim 3 in which said foundation has a form providing an annular gallery extending about said axis of rotation and disposed beneath and adjacent said wickets.

5. A hydraulic turbine installation as defined in claim 4 in which said gallery is defined by a wall disposed inwardly thereof toward said axis and having a removable portion providing upon removal thereof access from said gallery to said runner.

6. A hydraulic turbine as defined in claim 4 which comprises an operating mechanism operatively connected to said wickets for effecting operation thereof and supported within said gallery beneath said wickets.

7. A hydraulic installation as defined in claim 1 in which said wicket supporting means is suspended from a portion of said stay vane ring disposed below said point of connection of said rigid connection means to said stay vane ring.

8. A hydraulic turbine installation as defined in claim 1 in which said stay vanes are hollow and provide fluid flow passages extending generally vertically, said stay vane ring having an upper hollow stay vane cover member extending about said axis and supported by said stay vanes at the upper ends thereof, said stay vane ring having a lower hollow stay ring member extending about said axis and supporting said stay vanes at the lower ends thereof, a given one of said hollow members having partitions disposed in the planes of the respective water passages between adjacent stay vanes and forming compartments within said given hollow member respectively communicating with said flow passages of said stay vanes, the other hollow member having partitions disposed in the planes of alternate water passages between said stay vanes and forming compartments within said other hollow member respectively providing communication between the flow passages of two adjacent stay vanes.

9. A hydraulic turbine installation as defined in claim 8 which comprises a conduit connected to a compartment of said given hollow member for delivering a fluid to said compartment of said given hollow member for flow therethrough and through the passage of a hollow vane to a compartment of said other hollow member and thence through the passage of the adjacent hollow vane to another compartment of said given hollow member, said other compartment of said given hollow member being provided with an opening for withdrawal of the fluid therefrom.

References Cited in the file of this patent

UNITED STATES PATENTS

| | | |
|---|---|---|
| 1,043,403 | Curtin | Nov. 5, 1912 |
| 1,383,361 | White | July 5, 1921 |
| 1,458,121 | Brown | June 5, 1923 |
| 2,064,276 | Strattard | Dec. 15, 1936 |
| 2,077,648 | Thompson | Apr. 20, 1937 |
| 2,077,883 | Hand | Apr. 20, 1937 |
| 2,078,471 | Tinnerman | Apr. 27, 1937 |
| 2,081,431 | Hamer | May 25, 1937 |
| 2,271,137 | Hamer | Jan. 27, 1942 |
| 2,493,736 | Brown | Jan. 10, 1950 |
| 2,644,553 | Cushman | July 7, 1953 |
| 2,671,635 | Willi | Mar. 9, 1954 |
| 2,733,892 | Peyrin et al. | Feb. 7, 1956 |